United States Patent
Tsuji

(10) Patent No.: US 12,155,894 B2
(45) Date of Patent: Nov. 26, 2024

(54) DONATION DEVICE, DONATION METHOD, AND DONATION PROGRAM

(71) Applicant: Hayaki Tsuji, Kanagawa (JP)

(72) Inventor: Hayaki Tsuji, Kanagawa (JP)

(*) Notice: Subject to any disclaimer, the term of this patent is extended or adjusted under 35 U.S.C. 154(b) by 0 days.

(21) Appl. No.: 18/005,627

(22) PCT Filed: Aug. 26, 2021

(86) PCT No.: PCT/JP2021/031340
§ 371 (c)(1),
(2) Date: Jan. 16, 2023

(87) PCT Pub. No.: WO2022/059451
PCT Pub. Date: Mar. 24, 2022

(65) Prior Publication Data
US 2023/0291966 A1   Sep. 14, 2023

(30) Foreign Application Priority Data

Sep. 16, 2020 (JP) .................................. 2020-155670
May 24, 2021 (JP) .................................. 2021-086604

(51) Int. Cl.
*H04N 21/442* (2011.01)
*G06Q 20/08* (2012.01)
(Continued)

(52) U.S. Cl.
CPC ..... *H04N 21/44218* (2013.01); *G06Q 20/085* (2013.01); *H04N 21/466* (2013.01); *G06Q 30/0279* (2013.01)

(58) Field of Classification Search
CPC ........... H04N 21/44218; H04N 21/466; H04N 21/4788; G06Q 20/085; G06Q 30/0279;
(Continued)

(56) References Cited

U.S. PATENT DOCUMENTS

| 8,928,770 B2 | 1/2015 | Suzuki |
| 10,560,659 B2 | 2/2020 | Ahn et al. |

(Continued)

FOREIGN PATENT DOCUMENTS

| JP | 2001-283082 A | 10/2001 |
| JP | 2002-230239 A | 8/2002 |

(Continued)

OTHER PUBLICATIONS

Morikawa, H., Data-Driven Economy "Digital will transform all companies, industries, and societies." Professor, Graduate School of Engineering, The University of Tokyo.
(Continued)

*Primary Examiner* — Adil Ocak
(74) *Attorney, Agent, or Firm* — WC&F IP

(57) ABSTRACT

A donation amount is determined according to laughter of a target person.
A donation device 1 includes a video distribution means 10 transmitting a video V1 to be viewed by a target person to a terminal 2, a laughter detection means 14 detecting that the target person is laughing based on an emotional information indicating emotion of the target person acquired through the terminal, and a donation means 17 determining a donation amount of a valuable value to a predetermined donation destination in accordance with a laughter detected by the laughter detection means.

8 Claims, 7 Drawing Sheets

(51) Int. Cl.
*G06Q 30/0279* (2023.01)
*H04N 21/466* (2011.01)

(58) Field of Classification Search
CPC ... G06Q 30/0201; G06Q 30/0206; G06T 7/20
See application file for complete search history.

(56) References Cited

U.S. PATENT DOCUMENTS

| | | |
|---|---|---|
| 10,713,477 B2 | 7/2020 | Nakagome et al. |
| 2002/0069420 A1* | 6/2002 | Russell ............... H04L 63/0428 725/92 |
| 2011/0261219 A1 | 10/2011 | Suzuki et al. |
| 2017/0042439 A1* | 2/2017 | Yeow ..................... G16H 10/60 |

FOREIGN PATENT DOCUMENTS

| | | | |
|---|---|---|---|
| JP | 2004-013656 A | | 1/2004 |
| JP | 2005142975 A | | 6/2005 |
| JP | 2007-097047 A | | 4/2007 |
| JP | 2011234002 A | | 11/2011 |
| JP | 2012185736 A | | 9/2012 |
| JP | 2015-201149 A | | 11/2015 |
| JP | 2106133939 A | * | 7/2016 |
| JP | 2017-119550 A | | 7/2017 |
| JP | 2019-122034 A | | 7/2019 |

OTHER PUBLICATIONS

Lacey, P. & Lutkvist, J., "The Circular Economy Advantage Growth Strategies for the Digital Age", 2016.

* cited by examiner

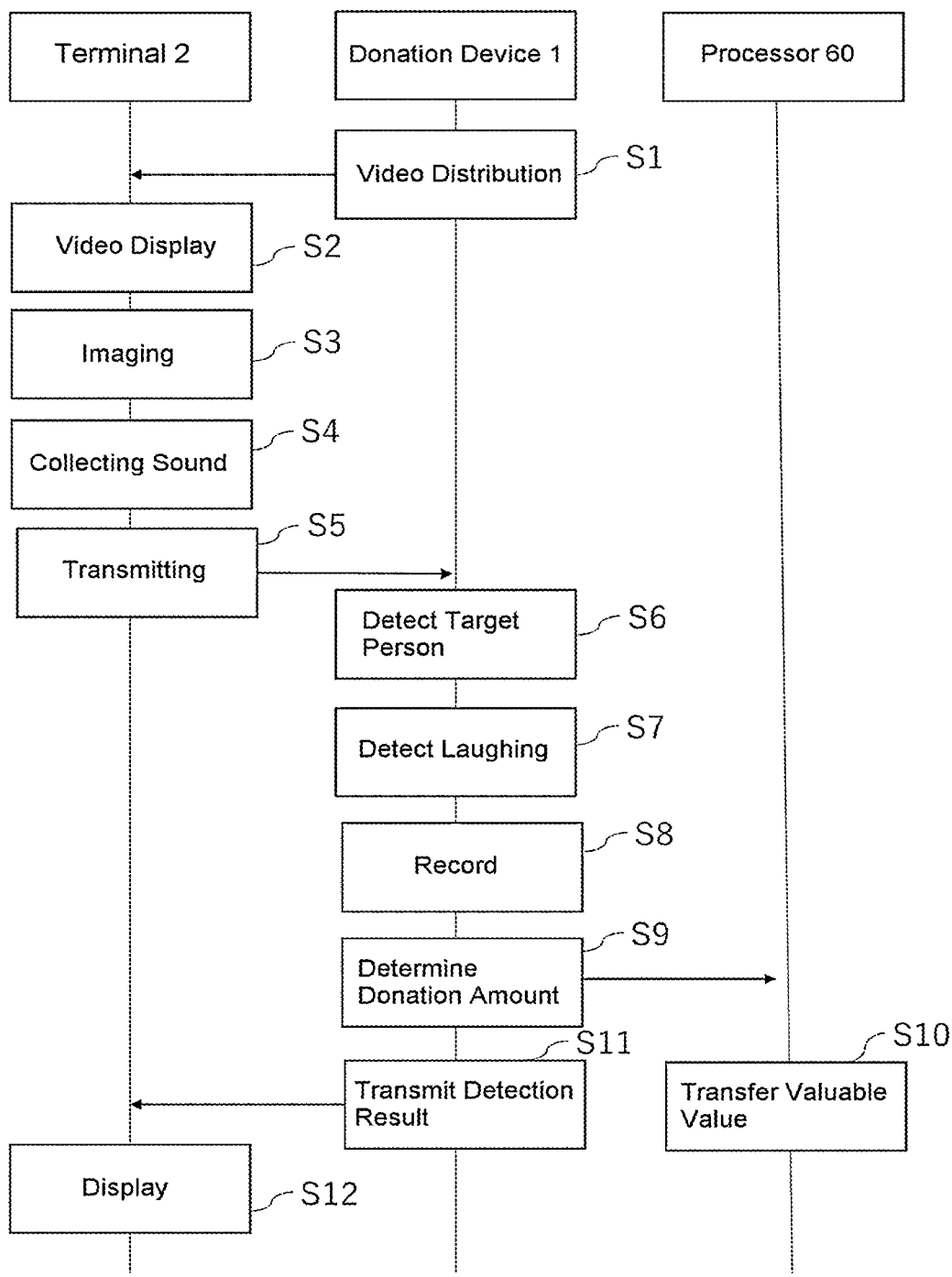

DONATION DEVICE, DONATION METHOD, AND DONATION PROGRAM

TECHNICAL FIELD

The present invention relates to a technique for determining a donation amount in response to audience laughter.

BACKGROUND ART

Various technologies related to donation services have been proposed. For example, Patent Literature 1 discloses determining yielding states on road conditions, and providing a donation service accordingly. Patent Literature 2 discloses a technology to determine facial expressions detected based on image data.

CITATION LIST

Patent Literature

Patent Literature 1: JP 2004-013656 A
Patent Literature 2: JP 2017-119550 A

SUMMARY OF INVENTION

Technical Problem

As described above, none of the conventional technologies focuses on the audience's laughter, and does not assume that donations are made in response to laughter.

Therefore, one of the purposes of the present invention is to determine the donation amount according to the audience's laughter.

Solution to Problem

In order to achieve the above objects, a donation device according to one aspect of the present invention includes a video distribution means transmitting a video to be viewed by a target person to a terminal, a laughter detection means detecting that the target person is laughing based on an emotional information indicating emotion of the target person acquired through the terminal, and a donation means determining a donation amount of a valuable value to a predetermined donation destination in accordance with a laughter detected by the laughter detection means.

The donation means may determine the donation amount in accordance with at least one of a count or a time of the laughter.

The video distribution means may transmit the video to a plurality of the terminals, and the donation means may determine the donation amount based on the emotional information acquired through the plurality of the terminals displaying the video at least partially identical to each other.

The laughter detection means may detect that a plurality of the target person watching the video at least partially identical to each other are laughing, and the donation means may determine the donation amount based on a rate of a number of the target person laughing among the target person detected.

The emotional information may include an image data, and the laughter detection means may detect a smile face included in the image data to detect that the target person is laughing.

The emotional information may include voice data, and the laughter detection means may detect laughing voice included in the voice data to detect that the target person is laughing.

The emotional information may include reaction related data input and transmitted by the target person through the terminal, and the laughter detection means may analyze the reaction related data to detect that the target person is laughing.

In order to achieve the above objects, a donation method according to one aspect of the present invention includes a video distribution step for transmitting a video to be viewed by a target person to a terminal, a laughter detection step for detecting that the target person is laughing based on an emotional information indicating emotion of the target person acquired through the terminal, and a donation step for determining a donation amount of a valuable value to a predetermined donation destination in accordance with a laughter detected by the laughter detection step.

In order to achieve the above objects, a donation program according to one aspect of the present invention causes a computer to implement instructions, and the program includes a video distribution instruction for transmitting a video to be viewed by a target person to a terminal, a laughter detection instruction for detecting that the target person is laughing based on an emotional information indicating emotion of the target person acquired through the terminal, and a donation instruction for determining a donation amount of a valuable value to a predetermined donation destination in accordance with a laughter detected by the laughter detection instruction.

The computer executable program can be provided by downloading via a network such as the Internet, or can be recorded and provided on various non-transitory computer readable recording media.

Effect of the Invention

According to the present invention, making donations in accordance with laughter makes people more conscious of laughter, which in turn improves their happiness. In addition, donations can also be used to redistribute wealth, and reduce poverty and hunger, thereby and the happiness of the world as a whole can be improved.

BRIEF DESCRIPTION OF DRAWINGS

FIG. 8 is a flow chart illustrating an example of a processing flow of a donation device according to an embodiment of the present invention.

PREFERRED EMBODIMENT

A donation device according to an embodiment of the present invention will be described below with reference to the drawings.

Overview of Donation System

Figure 1:
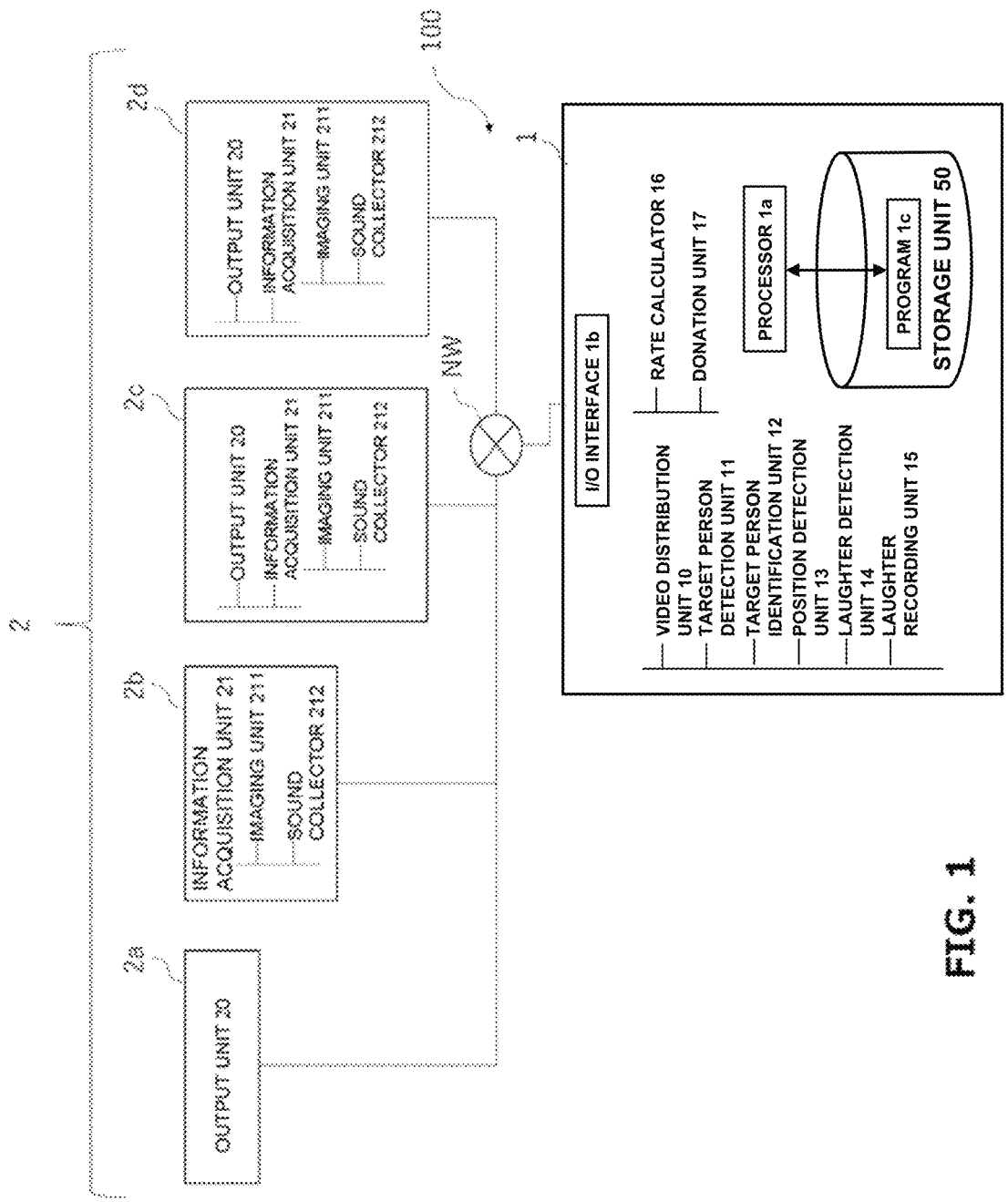
FIG. 1 is a functional block diagram illustrating an embodiment of a donation system including a donation device according to an embodiment of the present invention.

A donation system 100, illustrated in FIG. 1, is a system to determine a donation amount by detecting that a target person is laughing. The donation system 100 may acquire information about a person in any location, time, or situation. Places where a laughter is detected are places associated with public properties such as shopping malls, namely, shopping malls, streets, public halls, halls, in schools such as children, junior high and high schools, in public transportations (including inside of cars) such as stations, airports, ships, trains and busses, in outdoor facilities such as tourist areas, beaches, campgrounds, in accommodations such as hotels and inns, in medical facilities such as hospitals, nursing homes and care homes, in an extraterrestrial spaceships and in concepts including moon, mars and the like. The donation system 100 may detect the laughter of the target person living a daily life or the target person participating in an event and having an extraordinary experience. In other words, a detection target person may be a participant participating in an event, a customer who receives services both indoors and outdoors including restaurants, sports viewing facilities and various stores, or an ordinary citizen living a daily life such as walking on a public road and the like.

The detection target person may include various objects which can be visually recognized as laughing by a human other than a human. For example, the detection target person may be an animal such as a monkey, an article such as a doll, a stuffed animal, or a robot and the like, or an illustration or photograph.

The detection target person may be a viewer who watches a video provided through a terminal. In addition, the video viewed by this viewer may be a moving image content viewed unilaterally by a person. The moving image content may be distributed from a website where one or more specific companies distribute the video, or may be distributed on a posting type platform such as YouTube (R) where a plurality of companies or individuals post the video. Further, the video viewed by the viewer may be the video of the dialogue partner in the web conference software or the video conference software which interacts by transmitting and receiving the video in both directions. The video may be displayed on a display in two dimensions, or may be projected on a screen or a space, or may be viewed in three dimensions. The video may be a still image in addition to a moving image. Further, the video may be an image using virtual reality (VR) or augmented reality (AR) technology.

As illustrated in FIG. 1 for example, a donation device 1 and one or a plurality of terminals 2 are connected by a network NW to constitute the donation system 100.

In the present embodiment, as a premise, there may be a plurality of client terminals provided with the donation device 1 and the client terminals may communicate with each other in remote or near locations. In addition, a server terminal provided with the donation device 1 may exist and the donation device 1 may be used by a plurality of persons or one user accessing the server terminal.

Further, the donation device 1 may be distributed in one or a plurality of hardware configurations, and some or all of its functions may be configured on a cloud computer. The specific configuration of the donation device 1 will be described later.

A plurality of the terminals 2 are each connected to one donation device 1. The terminal 2 includes at least one of an output unit 20 outputting information and an information acquisition unit 21. As illustrated in FIG. 1, a terminal 2a is an example of a terminal including only the output unit 20, a terminal 2b is an example of a terminal including only the information acquisition unit 21, and a terminal 2c and a terminal 2d are examples of terminals including both the output unit 20 and the information acquisition unit 21. The terminal 2 may be a surveillance camera fixed inside or outside a store, a device built in a guide board, or a tablet terminal, a smartphone or a personal computer that can be held or carried by a viewer.

The output unit 20 is a functional unit that outputs an image to be viewed by the viewer, and is implemented by a display device, such as a display, or a projection device, such as a projector. The output unit 20 may output a screen displaying information about a detected laughter received from the donation device 1 to the terminal 2.

The information acquisition unit 21 is a functional unit collecting information (hereinafter also referred to as "emotional information") that mainly indicate emotions of the detection target person, such as facial expressions and voices. The emotional information includes information about laughter.

The information acquisition unit 21 mainly includes an imaging unit 211 and a sound collector 212. The imaging unit 211 is a functional unit for at least imaging a face of the detection target person and acquiring it as image data, and it is implemented by, for example, a visible light camera. As long as the imaging unit 211 can discriminate a human face, various cameras such as a camera that outputs in grayscale and a thermography camera can be used. The sound collector 212 is implemented by a microphone, for example, and collects human voices as voice data.

The output unit 20 and the information acquisition unit 21 may be implemented as one hardware configuration by, for example, a touch panel display. Further, the terminal 2 may be activated only during a time period that laughter is detected, for example, during a time period that various services are provided or an event is held, or may be activated other than the time period.

Functional Configuration of Donation Device 1

The donation device 1 includes a storage medium, for example the storage unit 50, such as a memory, a processor 1a connected to the storage medium, a communication module, an input/output interface 1b that connects to the network NW, and the like, and the processor executes a computer program 1c stored in the storage medium to implement the functional blocks illustrated in FIG. 1. The storage medium is a computer readable storage medium and may include storage devices such as a RAM (random access memory), a ROM (read only memory), disk drives, an SSD (solid state drive), a flash memory and the like. Here, a non-temporary storage device such as a ROM, a disk drive, an SSD, or a flash memory may be included in the donation device 1 as a separate storage device separated from the memory.

The donation device 1 includes a video distribution unit 10, a target person detection unit 11, a target person identification unit 12, a position detection unit 13, a laughter detection unit 14, a laughter recording unit 15, a rate calculator 16, and a donation unit 17. A part or all of the configuration of the donation device 1 may be implemented by a hardware configuration of the terminal 2.

The donation device 1 may be a computer program integrated in an application mainly having a function of video distribution or video chat, or may be provided as an API (application programming interface) applicable to a predetermined application.

In addition, a part of the configuration of the donation device 1 may be implemented by a device different from the donation device 1, which is connected by wire or wirelessly. For example, the video distribution unit 10 may be included in a server managed by a company that provides video distribution services or video chat tools. In this case, the donation device 1 may acquire from the server an identification information of the video distributed by the video distribution unit 10 and an information related to video viewing, such as a length of the video, a time of video distribution, a time of viewing start, and a time of viewing end. In addition, the donation device 1 may execute a process for associating the acquired information with detected laughter information. As a result, it is possible to analyze at which time point the target person laughed in the video. In addition, the donation device 1 may acquire the video displayed on the terminal 2 from the terminal 2, and execute a process for associating the video with the detected laughter information.

The video distribution unit 10 is a functional unit transmitting the video watched by the viewer to the terminals 2 (2a, 2c, 2d). The video may be moving image contents watched unilaterally by a person, or may be a video of a dialogue partner in a video chat in which the video is transmitted and received for a dialogue in both directions. The video may be, for example, a performance by a comedian. By distributing the video that induces laughter from viewers, the donation system can detect more laughter and more donations can be collected.

The video distribution unit 10 may simultaneously distribute the same video to a plurality of the terminals 2 connected to the donation device 1 through a network NW and cause the viewers to watch the video. In addition, this video may be watched in substantially real time with respect to the time when the video is recorded, or may be watched with respect to a video recorded at a different time. The video distribution unit 10 may perform streaming distribution of the video or may be configured to allow the terminals 2 to download the video in a batch or in multiples.

Figure 2:
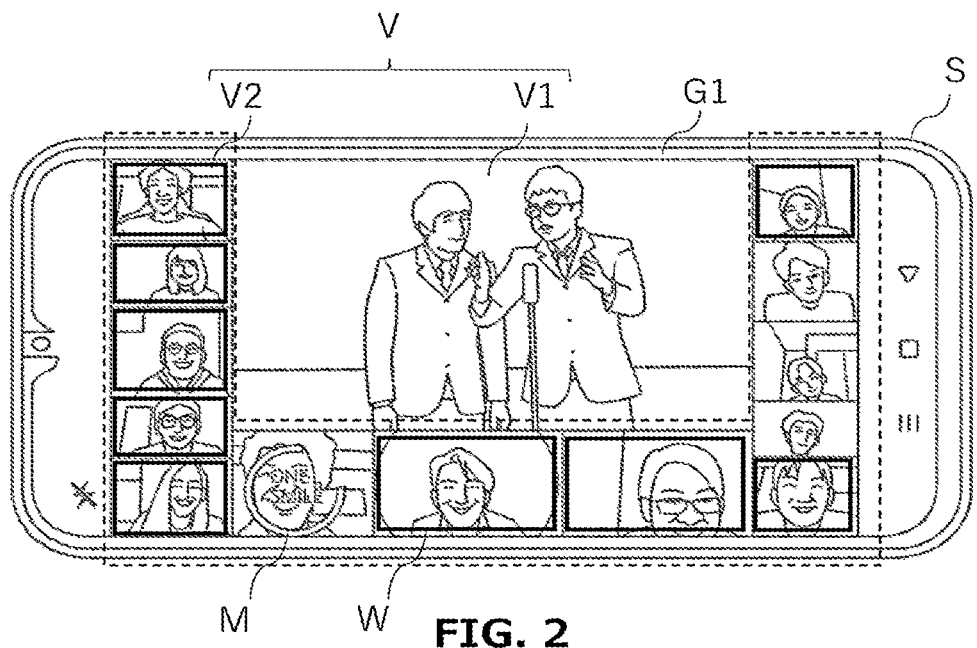
FIG. 2 is a diagram illustrating how a video distributed by a video distribution unit of a donation device according to an embodiment of the present invention is displayed on a terminal.

FIG. 2 is a diagram illustrating a screen G1 on which a video V distributed from the video distribution unit 10 is displayed on a display of a smartphone S, which is an example of the terminal 2. In the example illustrated in the figure, a video V1 showing a comedian's performance is displayed at an upper center of the screen. In addition, a plurality of videos V2 of viewers watching the same video V1 are displayed on the same screen as the video V1 on a left and right side and below the video V1. In other words, these plurality of videos V2 are respectively acquired through a plurality of terminals 2 displaying the same video V1. According to such a configuration, smile faces can be shared between the viewers at a distance, and the video V1 can be enjoyed with a sense of unity. In addition, laughter is induced by seeing the smile face of another viewer, and the video V1 can be enjoyed more and the donation amount in the donation system 100 can be collected more.

Further, on the screen G1, reaction related data that each viewer actively inputs and transmits through the terminal 2 may be displayed. This reaction related data may include various data that visually conveys emotions to other viewers, such as pictographs, stamps, various images, text data, or the like.

The plurality of the videos V2 may be videos of the same viewer over a time of viewing of the video V1, or videos of different viewers may be switched and displayed every predetermined time. According to a configuration for switching and displaying the videos V2 of the viewers, even when there are a large number of the videos V2 that cannot be displayed on the screen of the smartphone S at the same time, appearance of the viewers can be displayed in sufficient sizes. Further, the plurality of the videos V2 may include videos captured by the smartphone S. In this case, the viewer visually recognizes his or her own face on the screen of the smartphone S. In addition, excluding the videos, the videos V2 of the viewers other than himself or herself may be displayed.

The target person detection unit 11 is a functional unit for detecting a face of a person included in the video captured by the imaging unit 211. As a method for detecting a human face by the target person detection unit 11, a Haar-like feature classifier or various methods to detect human faces based on a big data containing human face data may be used. The target person detection unit 11 may detect not only a front of the person's face, but also a side face, a face seen from above, and a face seen from below as a human face. In addition, the target person detection unit 11 may detect a plurality of human faces from the video captured by one terminal 2.

The target person identification unit 12 is a functional unit for identifying a person detected by the target person detection unit 11. There are various techniques for identifying faces, such as face recognition technology, but it is sufficient if a person's face could be identified individually.

The position detection unit 13 is a functional unit for specifying a location of the person to be detected. The position detection unit 13 receives a position information of the terminal 2 from the terminal 2 transmitting the acquired videos of the viewers, and associates it with the videos. The position detection unit 13 may specify a location by a receiver of a GNNS (Global Navigation Satellite System), or other methods such as latitude/longitude information acquired by a separate communication processing unit, an IP address of the terminal 2 and the like. For example, the position detection unit 13 may specify which table seat the detected person is at when there is a plurality of table seats in a store.

The position detection unit 13 may be configured to detect the location of a person whose laughing by the laughter detection unit 14 instead of the configuration for specifying the location of the person to be detected. In a mode of detecting the laughter of the viewer watching the video V1 by the terminal 2, the position detection unit 13 may have a configuration of specifying a location of the terminal 2 where the laughter is detected, in addition to or instead of a configuration of specifying a distribution location of a moving image content watched by the laughter. According to such a configuration, when a performance is performed in a theater and the moving image contents in which the performance is captured are distributed in real time, the laughter of the viewer viewed through the terminal 2 can be included as the laughter of the theater. In addition, since it is possible to identify companies distributing interesting moving image contents, it is expected to attract customers.

The laughter detection unit 14 is a functional unit for detecting emotions of the person based on information indicating emotions of the person, such as emotional information, acquired by the information acquisition unit 21 of each of the terminals 2. In the present embodiment, the laughter detection unit 14 detects laughter emotions, that is, the laughter of the person.

Figure 3:
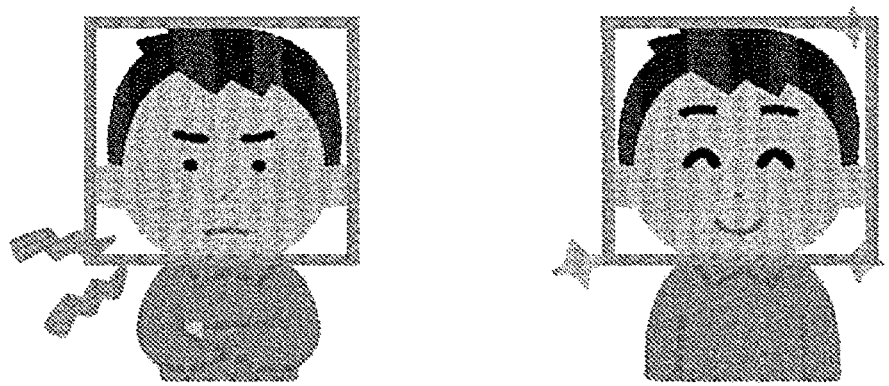
FIG. 3 is a diagram illustrating an example of detecting a face of a person by a target person detection unit included in a donation device according to an embodiment of the present invention.

The laughter detection unit 14 detects a smile face appearing on the face of the target person detected by the target person detection unit 11. For example, as illustrated in FIG. 3, a face of a person on a left side of the figure is detected by the target person detection unit 11, but it is not detected by the laughter detection unit 14 since it is not a smile face. On the other hand, a face of a person on a right side of the figure is detected by the target person detection unit 11 and is detected by the laughter detection unit 14 since it is a smile face. In addition, various technologies such as AI based face recognition technology may be used as a technology for implementing the laughter detection unit 14, but it is sufficient if a smile face can be detected.

In the example of FIG. 2, the laughter detection unit 14 detects that a person is laughing with respect to each of a plurality of the videos V2 captured by the terminal 2. The laughter detection unit 14 detects that the viewer appearing in the video V2 is laughing and displays the detected video in a manner different from other videos. In the same figure, a rectangular frame W is displayed on an outer edge of the video in which the detected viewers are displayed. In addition, in the same figure, an example to display a mark M on the video in which the detected viewers are displayed. Either or both of the mark M and the frame W may be displayed, or the display may be different depending on a degree of laughter.

Figure 4:
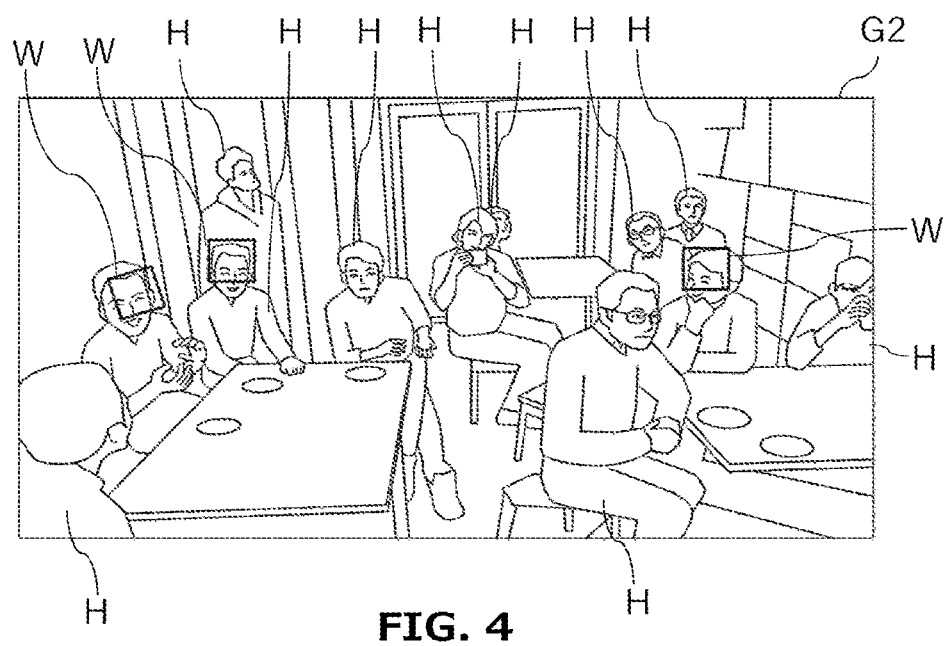
FIG. 4 is a diagram illustrating an example of detecting faces of a plurality of people from one video by a target person detection unit included in a donation device according to an embodiment of the present invention.

FIG. 4 is an example illustrating a screen G2 in which the video acquired from the imaging unit 211 and a detection result by the laughter detection unit 14 are superimposed and displayed. In the figures, faces of a plurality of persons are detected in the videos acquired by the imaging unit 211 of one terminal 2. The laughter detection unit 14 detects whether each of the plurality of the faces are laughing when the target person detection unit 11 detects the plurality of faces of people. In the example of the same figure, a rectangular frame W is displayed on the face of a person H whose laughter is detected.

The screen G2 may be displayed on a position visible from an area where laughing is detected. The screen G2 is displayed, for example, on the terminal 2 in a store where a predetermined event is held. According to this configuration, the detection target person can feel that his or her laughter contributes to the donation and an intension to smile is further increased. Furthermore, on the screen G, the detection results may be graphically displayed. The detection results include information related to laughter, for example, a count, a time point or a length of the laughter.

In addition, the laughter detection unit 14 may detect that the viewer is laughing based on voice data collected by a sound collector 212 of the terminal 2. Specifically, the laughter detection unit 14 detects that the viewer is laughing by detecting laughing voices included in the voice data. Further, the laughter detection unit 14 may detect that the viewer is laughing based on a reaction data that each of the viewers actively input and transmit through the terminals 2. The pictographs, stamps or images may be stored in association with detection of laughter in advance, and when a predetermined pictograph, stamp or image is input, the viewer may be regarded as laughing. In addition, it may be possible to detect that the pictogram, stamp or image is laughing by a separate image analysis technique. In a case of text data, laughing may be detected by analyzing the text. The reaction data that each of the viewers actively input and transmit through the terminals 2 is another example of an "emotional information" in the claims.

The laughter detection unit 14 records a time that a laughing viewer is detected. Various recording methods are conceivable, such as using a system date of a computer provided with the laughter detection unit 14, but any method can be used as long as the time at which laughter is detected can be recorded.

In addition to or instead of detecting the laughter emotions, the laughter detection unit 14 may be configured to detect other facial expressions, such as anger, sadness, surprise, concentration and the like, other than a smile, i.e., as a laughter and other emotion detection unit. In this case, there may be a mode of the laughter and other emotion detection unit to detect a concentration based on a state of a pupil by imaging the pupil of the target person. When the laughter detection unit 14 is configured as the laughter and other emotion detection unit that performs detecting of smile faces and facial expressions other than the smile faces, the laughter recording unit 15, the rate calculator 16, and the donation unit 17 may be applied to various expressions instead of a smile. For example, when a smile is detected in a state in which many facial expressions such as sadness and anger are detected in a predetermined region, the donation amount may be increased or decreased more than usual. In other words, in the present embodiment, a donation unit price per smile is set to 1 Japanese yen, but in a situation where many facial expressions such as sadness and anger are detected, the donation unit price per smile may be set to 5 Japanese yen or the like. On the other hand, in a situation where many facial expressions such as sadness and anger are detected, the donation unit price per smile may be set lower than a standard unit price.

In addition, the donation device 1 may store results of detected expressions in a predetermined database or the like in conjunction with the detection of the various expressions described above. For example, the laughter recording unit 15 may be configured to register not only a smile but also may be configured as a laughter and other emotion recording unit, to also register a detection result of the expressions other than a smile, such as anger, sadness, surprise, or a state of concentration.

The laughter detection unit 14 may determine a degree of the detected laughter. For example, the laughter detection unit 14 determines the degree of the detected laughter step by step. The laughter detection unit 14, for example, determines the degree of the laughter for detected smiles from image data acquired by the imaging unit 211. For example, in a case where levels are determined in 10 stages, a faint smile may be determined to be a level 1, and a big smile may be determined to be a level 10, and 2 to 9 levels in between may be appropriately set so as to gradually increase the degree of the laughter. The laughter detection unit 14 may determine a degree of a smile face for each person identified by the target person detection unit 11. Various methods can be considered for determining the degree of the smile face, such as determination based on big data containing human face data, or determination using AI based face recognition technology, but any method can be used as long as the degree of the laughter can be determined.

Further, the laughter detection unit 14 may determine the degree of the laughter in accordance with the laughter detected from the voice data. The laughter detection unit 14 determines the degree of the laughter according to, for example, a manner of the laughter and a volume of the laughter. Further, the laughter detection unit 14 determines the degree of the laughter based on both of the image data and the voice data.

The laughter detection unit 14 may detect a smile for each person identified by the target person detection unit 11. As a result, it is possible to calculate a number of times that the target person smiled.

Figure 5:
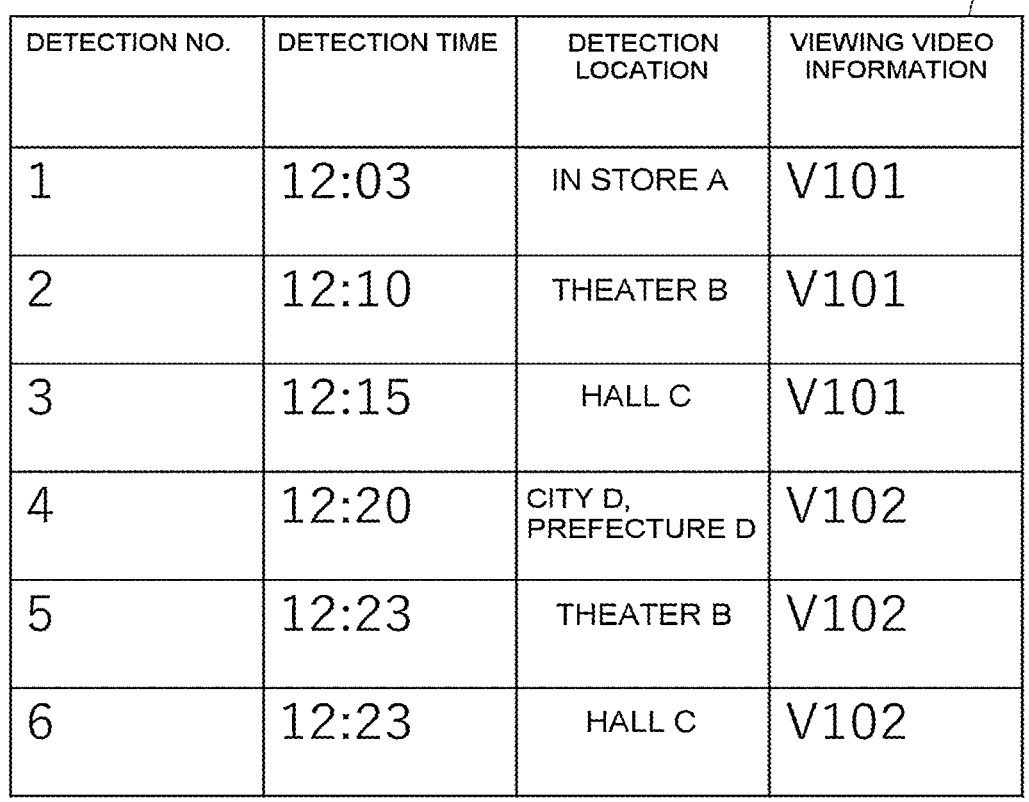
FIG. 5 is a diagram illustrating an example of information recorded by a smile face information recording unit included in a donation device according to an embodiment of the present invention.

The laughter recording unit 15 is a functional unit for recording information related to a detection count of the laughter, a detection time, and a detection location, in a storage unit 50. FIG. 5 is an example of a table T1 stored in the storage unit 50. For example, it is recorded that the detected count is 200, and the detection time is 12:03 for a first time and 12:10 for a second time for each of the count of smiles. In addition, the detection location may be a location of the store or may be registered by further dividing the store. For example, when there are a table seat 1, a table seat 2, and a table seat 3, after specifying the location, a detection of a smile at the table seat 2 can be recorded at 12:03 for the first time, and a detection of a smile at the table seat 3 can be recorded at 12:10 for the second time. In addition, as illustrated in FIG. 5, a predetermined store name, such as in a XX store, can be recorded as the detection location, while a predetermined store address, latitude/longitude, IP address, or any other means can be recorded in a store, such as in a XX City in a XX prefecture and the like. In addition, a name of a theater where a performance is performed or a name of a hall where a public viewing of a performance is performed may be recorded as the detection location.

Further, the laughter recording unit 15 records identification information of the video displayed together with information related to the detected laughter when the video distributed through the video distribution unit 10 is displayed on the terminal 2. Even if the output unit 20 and the information acquisition unit 21 are configured by separate devices, the identification information of the video and other detection results may be recorded in association with each other by associating the detection target person with the video being watched in advance or after.

The laughter recording unit 15 may record a transition of the degree of smile faces along a time axis of the video V1 displayed on the terminal 2. According to this configuration, even when a plurality of viewers watch the same video V1 at different timing, a time point in the video V1 at laughter occurs is analyzed after the fact, and when the viewers are watching at the same time, it is possible to know when the viewers laughed at the same time and laughed loudly.

Note that the example illustrated in FIG. 5 is only an example and it is sufficient if information related to a detection count, a detection time, and a detection location, can be recorded. The laughter recording unit 15 may add individual detection counts within a predetermined group and record as a total detection count. More specifically, the detection count of the laughter of the viewers watched the same video may be added up and recorded. In addition, the laughter recording unit 15 may assign the identification information to the detection target person detected and record it in the storage unit 50 with the detection time and the detection location. According to this configuration, the laughter detected from the video acquired from the plurality of the imaging units 211 can be aggregated for each of the detection target persons. The laughter recording unit 15 may record a video of a person detected laughing. The video may be a moving image or a still image, such as a photograph. Further, the donation amount calculated by the donation unit 17 and added by the laughter may be recorded together.

The video of the person detected laughing is appropriately displayed on the terminal 2. This video may be sold for a fee via a personal data trust bank or an application. Such a configuration is also useful when videos or images are taken in a facility where a user lives his or her daily life, such as a nursery school or a nursing care facility, and watched by a third party such as a family member who is different from the target person. According to this configuration, videos or images of the smiling faces can be automatically captured and stored so that the videos or images become a good memorial for a person who has captured and his or her family. In addition, when the donation amount is recorded and a person can be appropriately referred, the viewers can feel that they have contributed to a society through the donation by laughing and can further increase intension to smile.

The rate calculator 16 is a functional unit for calculating a rate of laughing people detected during a predetermined event. For example, the rate calculator 16 calculates a rate of time when a smile face is detected to an entire time of the video captured by the imaging unit 211. When a total time of the captured video is 2 hours and a time when the smile face is detected is 45 minutes, it is calculated to be 37.5%. In addition, the rate calculator 16, for example, can calculate a rate of the smile face detected by the laughter detection unit 14 to the face of the detection target person detected by the target person detection unit 11. When the face of the person detected by the target person detection unit 11 counts 1000 times and a number of the smiling faces count 250 times, it is calculated that the rate of the smile face is 25%.

The method for calculating the rate of the smile face is not limited to the above, and various methods may be used.

The donation unit 17 is a functional unit for determining a donation amount of a valuable value to a predetermined donation destination in accordance with a laughter detected by the laughter detection unit 14. The donation unit 17 determines, for example, the donation amount according to a count or a time of the laughter. For example, the donation unit 27 adds a donation of 1 Japanese yen to the donation amount when the laughter is detected once. Further, the donation unit 17 may increase the donation amount as the laughter continues for a longer time. The donation unit 17 may determine the donation amount according to a duration of the laughter with respect to a length of the video V1. Further, the donation unit 17 may calculate a rate of people at a moment when the largest number of viewers laugh during watching the video V1, such as a momentary laughter acquisition rate, and determine the donation amount in accordance therewith. This ratio of people may be calculated by taking into consideration of a timing that the viewers, watched the same video at a different time, laugh.

The donation unit 17 may determine the donation amount according to a rate of people laughing calculated by the rate calculator 16. In other words, the donation unit 17 may determine the donation amount based on the rate of the smile face. If there are many people laughing, the donation unit 17 may determine the donation amount larger than a sum in accordance with a number of people laughing. People are happier when many people are laughing at the same time than when they are laughing one by one, so they can contribute to a happiness of society by incentivizing larger donations.

The donation unit 17 may determine the donation amount up to a predetermined donation source. An investor of the valuable value donated based on a determination by the donation unit 17 is arbitrary and may be a viewer, an event planner, or a company or a performer that produces the video V1, or may be a third party who agrees with the donation system. For example, if a donation source is set to 1000 Japanese yen and the smile face is detected 1000 times, the donation amount will reach 1000 Japanese yen, which is the upper limit for donations.

The donation unit 17 can use a sale of a predetermined event as donation sources. The predetermined event may be various events including an event for donating. The predetermined event may be an event held at a predetermined location in a real space, or an event held in a virtual space. Further, the predetermined event may consist of one or a plurality of videos distributed by the video distribution unit 10. In this case, sales of the event may be a viewing fee of the distributed video, or a part or all of a subscription fee including the distributed video. For example, if the sales of the predetermined event are 10000 Japanese yen, it can be used as a donation source. In other words, until the smile face is detected 10000 times, a donation of 1 Japanese yen is made for each time, and the donation is not made after 10001 times although the smile face is detected.

The sales of the event are stored in association with identification information of the event in the storage unit 50. The donation unit 17 determines the upper limit of the donation amount in the event based on the sales of the event stored in the storage unit 50.

The rate between the detected laughter and the donation unit price by the donation unit 17 may be set stepwise. In other words, a donation rate up to a predetermined count may be different from a donation rate after the predetermined count.

The donation unit 17 may determine the donation amount in consideration of the degree of smile faces determined by the laughter detection unit 14. The donation unit 17 may refer to a coefficient according to the degree of the smile faces, calculate an amount obtained by multiplying the donation unit price per a smile face, and include it in the donation amount. For example, if the degree of smile face is simply evaluated on a scale of 10 and multiplied by a coefficient corresponding to the scale, and if the degree of the smile face is 8 on the scale of 10, it will be 1×0.8=0.8 Japanese yen. Therefore, when the degree of the smile face is 8 on the scale of 10, a donation of 0.8 Japanese yen is added.

The donation unit 17 may add a transition of occurrence of laughter or a transition of the degree of smile faces along a time axis of the video displayed on the terminal 2, and may determine the donation amount in accordance with the number of people whose laughter is detected at the same time. According to this configuration, even when a plurality of viewers watch the same video at a different timing, if they watch the same video at the same place at the same time, it is determined that a plurality of viewers make a large laugh at the same time, and the large laugh can be one of conditions for donation.

The donation unit 17 may determine the donation amount based on the rate of number of laughing viewers among a number of the viewers watching the same video V1.

The donation unit 17 may calculate the donation amount based on information identified by the target person identification unit 12. For example, the donation unit 17 may limit a number of times that the same person makes a donation with the smile face to a predetermined number of times. When the number of times that the same person makes the donation with the smile face is limited to 10 times, and when the laughter detection unit 14 respectively detects the smile face for a first party and a second party, each of the first party and the second party can make the donation by the donation unit 17 for up to 10 times, that is, limited up to 10 Japanese yen. In addition, the donation unit 17 may change the donation unit price to the laughter for each of the target persons.

The donation unit 17 may set a limit to a predetermined times that each person in a store makes a donation. It is possible to set for each person, for example, a donation count for the first party is 10 times, and a donation count for the second party is 20 times.

The donation amount determined by the donation unit 17 is transmitted to a predetermined processor 60 that executes processing for transferring the valuable value and the donation to a predetermined donation destination is made by the processor 60. The processor 60 has a processing function for transferring digital money, and may execute processing for transferring virtual currency by using encryption technology such as a blockchain, for example. Further, the processor 60 may be a device for transferring money via an artificial satellite or a submarine cable. In addition, the processor 60 may be a device for mining a virtual currency and transferring the money as an asset of the donation destination instead of a configuration for transferring a valuable value. Further, the processor 60 may be a device that causes the donation device 1 and the terminal 2 to mine a virtual currency and transfers its earnings as assets to be donated. The processor 60 may be implemented by one or a plurality of hardware configuration, or may be a partially or entirely implemented by a cloud computer.

Donations may include basic income or social security distributions, or may be realized as a part of a wealth redistribution system, wealth sharing, or value sharing system. In addition, donations may also be made to emerging countries, disaster areas, welfare facilities, or other recipients that can directly support the socially vulnerable.

A series of processes performed by the processor 60 may be performed by the donation unit 17.

Example of Screen

With reference to FIGS. 6a-6d and FIG. 7, another example of a screen displayed on the terminal 2 will be described.

Screens G3 to G6 illustrated in FIGS. 6a-6d are examples of the screens displayed on the terminal 2 owned by the detection target person, such as a smart phone or a tablet terminal. The terminal 2 is associated with the detection target person through, for example, a predetermined login process, acquires a detection result from the detection target person from the storage unit 50, and displays it on the screen.

Figure 6:
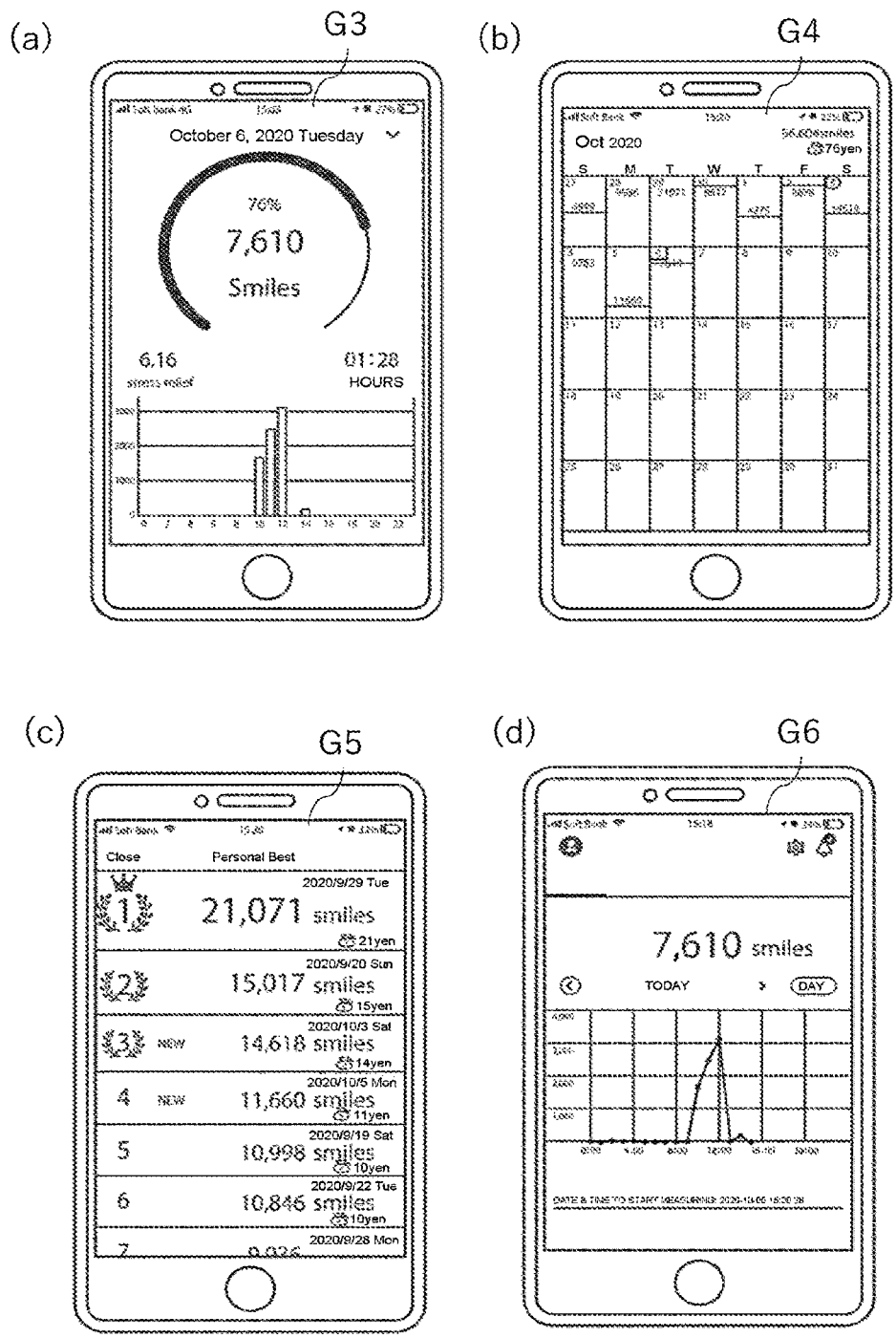
FIG. 6 are diagrams illustrating screen examples displayed on a terminal by a donation device according to an embodiment of the present invention, in which (a) illustrates a first example, (b) illustrates a second example, (c) illustrates a third example, and (d) illustrates a fourth example.

The screen G3 illustrated in FIG. 6a displays counts and time of laughs of a specific detection target person detected in a predetermined day. In this example, in addition to the counts and time of laughs, a pie chart illustrating a degree of achievement relative to a target counts of laughs and a bar chart calculated the counts of laughs for each time zone are displayed. In addition, an amount of stress released by laughter during the day is displayed numerically as "stress relief."

The screen G4 illustrated in FIG. 6b is an example of a screen displaying the detection results monthly. The screen G5 illustrated in FIG. 6c is an example of a screen displaying counts of laughter detected for each day in ranking order. In this screen, the donation amount added for each day is also displayed. The screen G6 illustrated in FIG. 6d is a figure displaying the counts of laughter detected for each day in a line graph. The terminal 2 may receive a message of thanks from a recipient of the donation destination through the donation device 1 and display it.

According to the screens G3 to G6, the detection target person can recognize counts and time of his or her laughs and an awareness of smiling on a daily basis is improved. In addition, by checking the donation amount added by own laughter, he or she can feel that he or she has made a contribution to a society.

Figure 7:
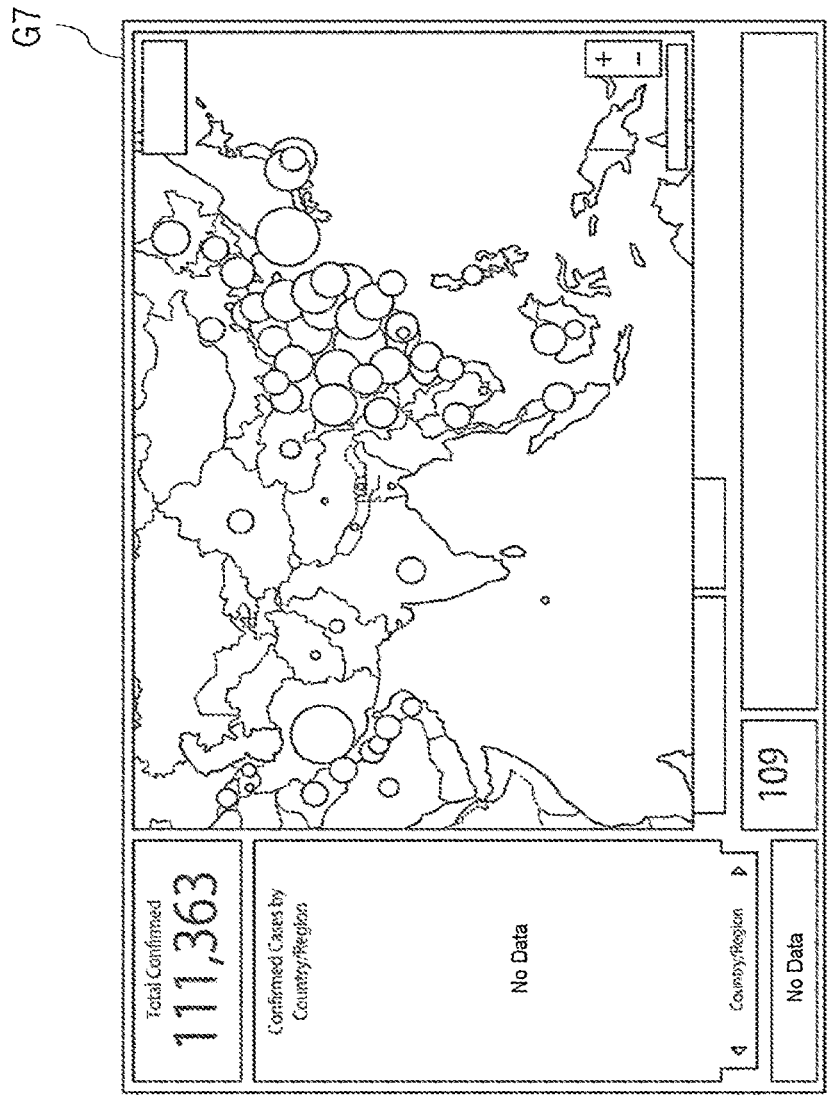
FIG. 7 is a diagram illustrating another example of screens displayed on a terminal by a donation device according to an embodiment of the present invention.

FIG. 7 illustrates a screen G7 in which the detection results of laughter is mapped on a map. On the screen G7, circles are illustrated at points where laughter is detected, and diameters of the circles increase as detected counts increase. The screen G7 may be displayed on the terminal 2 owned by the target person, a public guide board as an example of the terminal 2, or displays in stores, or the like. According to this configuration, a place where many people laugh is obvious at a glance, and it is possible to raise awareness of increasing smiles in a city where one lives. In addition, although a world map is illustrated in the example of the screen G7, by displaying a map of a larger scale, a game element such as laughing at a predetermined point of location and completing a quest can be added, and social contribution can be made while enjoying. Furthermore, buildings and events in which a lot of laughter occurs can be visualized on a map. According to the configuration, there is also an effect of attracting customers to a point where there are many laughs. In addition, the map may be a map illustrating a position of the space instead of or in addition to the map on the earth, for example, it may be a map of the space solar system. According to this configuration, for example, it is possible to know from other stars that a person on the moon is laughing.

Processing Flows

An example of processing method of the donation system 100 according to the present embodiment will be described with reference to a sequence diagram of FIG. 8. Here, a configuration for determining the donation amount based on the fact that a viewer is made to watch a video and is laughing at the video will be explained.

The video distribution unit 10 of the donation device 1 distributes video for the viewer to watch to the terminal 2 (step S1). In a case where the video is not watched, the step S1 is unnecessary. Then, the output unit 20 of the terminal 2 displays the video received (step S2). The imaging unit 211 of the terminal 2 captures a video of the viewer (step S3) and the sound collector 212 collects sounds (step S4). Then, the video and sounds of the viewer is transmitted to the donation device 1 (step S5). The steps S3 to S5 may be performed in any order and some or all of them may be performed simultaneously.

When the donation device 1 received the video and the sounds transmitted from the terminal 2, the target person detection unit 11 detects the target person (step S6). Then, it is detected that the target person is laughing (step S7). After or at the same time as step S6 or step S7, the detection location and time are specified, the location being by the position detection unit 13, and the detection target person is identified by the target person identification unit 12. The detection result is recorded by the laughter recording unit 15, in the storage unit 50 (step S8).

The donation unit 17 of the donation device 1 determines the donation amount based on the detection result of the information related to laughter (step S9). In accordance with the donation amount determined, the processor 60 transfers the valuable value from a predetermined investment source account to a donation destination account (step S10). The donation amount determined is stored in the storage unit 50 at appropriate timing.

The detection result is transmitted from the donation device 1 to the terminal 2 (step S11). The terminal 2 displays the detection result in an appropriate manner (step S12).

<Effects of Embodiments>

According to the present invention, making donations in accordance with laughter makes people more conscious of laughter, which in turn improves their happiness. In addition, donations can also be used to redistribute wealth, and reduce poverty and hunger, thereby and the happiness of the world as a whole can be improved. Consequently, it will be possible to contribute to the SDGs. Further, by extension, all human beings may be awarded the Nobel Peace Prize.

<Supplementary Information about Present Embodiment>

Although the present invention has been described based on the embodiments described above, the present invention is not limited to the above-described embodiments, and various modifications and applications are possible within the scope of the gist of the present invention. Since the donation system 100 has a function of quantifying the fact that the detection target person is laughing, the function can be applied and used for evaluating the performance of a comedian, or used as an aid for judging a comedian contest.

REFERENCE SIGNS LIST 100 donation system
  1 donation device
    11 target person detection unit
    12 target person identification unit
    13 position detection unit
    14 laughter detection unit
    15 laughter recording unit
    16 rate calculator
    17 donation unit
    50 storage unit
  2 terminal
    20 output unit
    21 information acquisition unit
      211 imaging unit
      212 sound collector

The invention claimed is:

1. A donation device comprising an input-output interface configured to interface with a network, a processor connected to the input-output interface, and a storage unit connected to the processor, the storage unit including a non-transitory storage medium storing processor executable instructions that when executed cause the processor to perform as functional units, the functional units comprising:
  a video distribution unit configured to transmit via the input-output interface a video over the network to a video output of a terminal, for viewing by one or more viewers at the terminal;
  a target person detection unit, configured to
    receive through the network via the input-output interface, from an information acquisition unit of the terminal or from a different information acquisition unit of a different terminal, a captured video of the one or more viewers at the terminal watching the video, and
    detect one or more human faces in the captured video, as one or more detected faces, based on applying a face detection process to the captured video, and to determine the one or more detected faces as respective face images of one or more target persons;
a target person identification unit, configured to identify the one or more target persons and generate corresponding target person identification information, based on applying a face recognition process to the respective face images of the one or more target persons;
an emotion detection unit configured to detect, based on the respective face images of the one or more target persons, instances of individual ones of the one or more target persons showing an emotion, by a detecting that includes identifying a kind of the emotion, between laughter and an emotion other than laughter;
an emotion instance recording unit, configured to record in the storage unit records of the instances detected by the emotion detection unit, the records comprising the target person identification information, the kind of the emotion, the time of the instance and, from the captured video, a video of the target person showing the emotion; and
a donation unit configured to:
  determine a donation amount of a valuable value to a predetermined donation destination in accordance with the record of the incidences of the target person showing the emotion, and
  perform a transferring of the donation amount of the valuable value to the predetermined donation destination, via the input-output interface, over the network.

2. The donation device according to claim 1, wherein the donation unit is configured to determine the donation amount, based on the records of the instances stored in the storage unit including records of instances wherein the emotion shown by the one or more target persons is laughter, in accordance with a count of times of the laughter.

3. The donation device according to claim 1, wherein:
the terminal is among a plurality of terminals;
the video distribution unit is further configured to transmit the video via the input-output interface, over the network to each terminal among the plurality of the terminals, for respective viewing by a respective at least one viewer at each terminal among the plurality of terminals;
the target person detection unit is further configured to
  receive through the network via the input-output interface, from a respective information acquisition unit of each terminal among the plurality of terminals, a respective captured video of the respective at least one viewer at the terminal watching the video or watching a video at least partially identical to the video, and
  detect corresponding to the respective captured video from each of the terminals, a respective at least one target person in the captured video, based on applying the face detection process and the face recognition process to the captured video;
the emotion detection unit is further configured to detect, corresponding to each of the terminals, based on respective images of the least one target person detected in the terminal's video capture, instances of the at least one target person showing an emotion, by a detecting that includes identifying the kind of the emotion shown by the at least one target person, between laughter and an emotion other than laughter;
the emotion instance recording unit is further configured to record in the storage unit, records of the instances detected, by the emotion detection unit, of each terminal's at least one target person showing the emotion;
the donation unit is further configured to determine the donation amount further based on the records of the instances detected, by the emotion detection unit, of each terminal's at least one target person showing an emotion.

4. The donation device according to claim 3, wherein
the emotion instance recording unit is further configured to obtain, from the video distribution unit, or from an external server through the network and via the input-output interface, an identification of the video viewed by the respective at least one viewer at each terminal among the plurality of terminals,
the emotion instance recording unit is further configured to include the identification of the video in the records of the instances detected, by the emotion detection unit, of each terminal's at least one target person showing the emotion,
the emotion detection unit is further configured to detect, based on the identification of the video in the records of the instances detected, that a plurality of the target persons watching the video at least partially identical to each other are laughing, and
the donation unit is further configured to determine, based on the emotion detection unit detecting that a plurality of the target persons watching the video at least partially identical to each other are laughing, the donation amount based on a rate of a number of the target person laughing among the target persons detected.

5. The donation device according to claim 1, wherein
the emotion detection unit is further configured to detect a smile face included in the respective face images of the one or more target persons and, based on a detection of the smile face, to detect that individual ones of the one or more target persons are is laughing.

6. The donation device according to claim 1, wherein
the captured video of the one or more viewers includes voice data, and
the emotion detection unit is further configured to detect laughing voice included in the voice data and, based on a positive detecting of the laughing voice, to detect that the target person is laughing.

7. The donation device according to claim 1, wherein the emotion detection unit is further configured to:
  receive, via the input-output interface from the network, a reaction related data that is input by and transmitted by the target person through the terminal,
  perform an analyzing of the reaction related data, and
  detect that the target person is laughing further based on a result of the analyzing.

8. A non-transitory storage medium storing a processor-executable donation program comprising processor-readable instructions for execution by a processor connected to the non-transitory storage medium, to a storage unit, and to an input-output interface configured to interface with a network, the donation program comprising:
a video distribution instruction that, when executed, causes the processor to transmit a video, via the input-output interface over the network, to a video output of a terminal for viewing by one or more persons at the terminal;
a target person detection instruction that when executed causes the processor to
  receive through the network via the input-output interface, from an information acquisition unit of the terminal or from a different information acquisition unit of a different terminal, a captured video of the one or more viewers at the terminal watching the video, and detect one or more human faces in the captured video, as one or more detected faces, based on applying a face detection process to the captured video, and to determine the one or more detected faces as respective face images of one or more target persons;

a target person identification instruction that when executed causes the processor to identify the one or more target persons and generate corresponding target person identification information, based on applying a face recognition process to the respective face images of the one or more target persons;

an emotion detection instruction that when executed causes the processor to detect, based on the respective face images of the one or more target persons, instances of individual ones of the target persons showing an emotion, by a detecting that includes identifying a kind of the emotion, between laughter and an emotion other than laughter;

an emotion instance recording instruction that when executed causes the processor to record in the storage unit records of the instances detected by the emotion detection unit, the records comprising the target person identification information, the kind of the emotion, the time of the instance and, from the captured video, a video of the target person showing the emotion; and a donation instruction that when executed causes the processor to:

determine a donation amount of a valuable value to a predetermined donation destination in accordance with the record of the incidences of the target person showing the emotion, and perform a transferring of the donation amount of the valuable value to the predetermined donation destination, via the input-output interface, over the network.

\* \* \* \* \*